(No Model.)

L. D. RAILSBACK.
MACHINE FOR MAKING ICE, ICE CREAM, &c.

No. 443,984. Patented Dec. 30, 1890.

WITNESSES:
F. Dean Rhodes
James Walsh

INVENTOR:
Lafayette D. Railsback,
per A. E. W. Bradford,
ATTORNEYS.

UNITED STATES PATENT OFFICE.

LAFAYETTE D. RAILSBACK, OF INDIANAPOLIS, INDIANA.

MACHINE FOR MAKING ICE, ICE-CREAM, &c.

SPECIFICATION forming part of Letters Patent No. 443,984, dated December 30, 1890.

Application filed January 2, 1890. Serial No. 335,605. (No model.)

*To all whom it may concern:*

Be it known that I, LAFAYETTE D. RAILSBACK, a citizen of the United States, residing at Indianapolis, in the county of Marion and State of Indiana, have invented certain new and useful Improvements in Machines for Making Ice, Ice-Cream, &c., of which the following is a specification.

My present invention consists in certain improvements upon that class of machines for making ice, ice-cream, &c., which embody a revolving cylinder upon the periphery of which the ice gathers as it revolves, whereby the power of the refrigerant is more perfectly utilized than has heretofore been the case, and whereby the devices for breaking up and removing the film of ice as it is frozen are improved, as will be hereinafter more particularly described and claimed.

Figure 1:
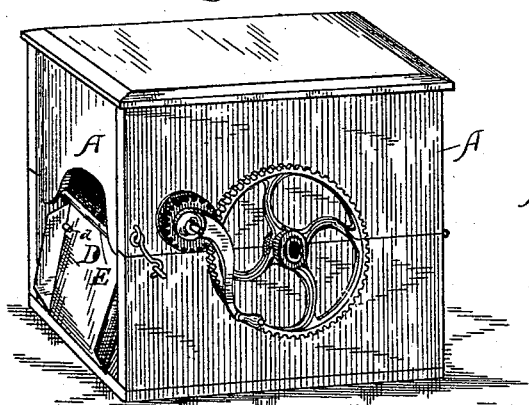
Figure 4:
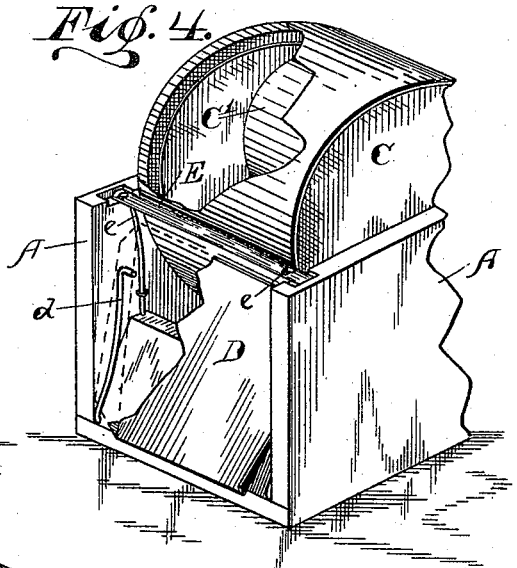
Figure 2:
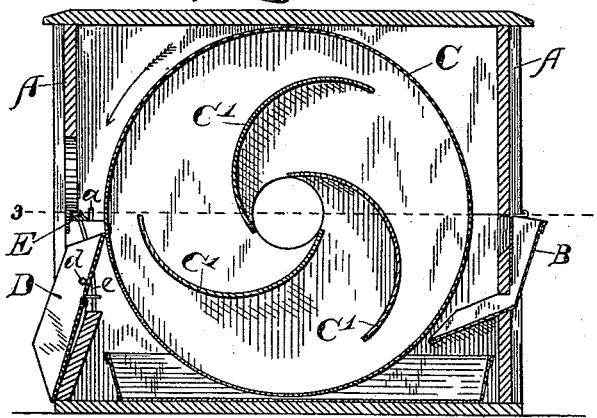
Figure 3:
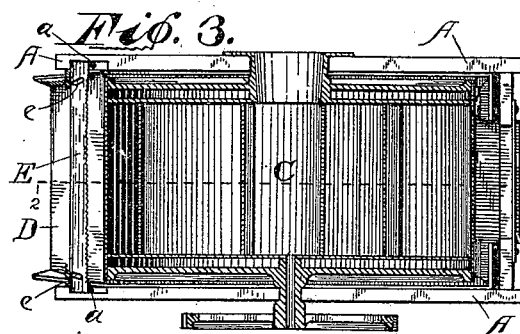
Figure 5:
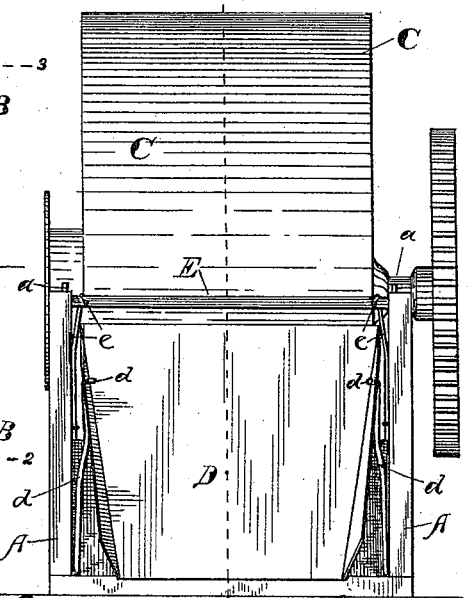

Referring to the accompanying drawings, which are made a part hereof, and on which similar letters of reference indicate similar parts, Figure 1 is a perspective view of a machine embodying my said invention; Fig. 2, a central vertical sectional view thereof on the dotted line 2 2 in Figs. 3 and 5; Fig. 3, a horizontal sectional view looking downwardly from the dotted line 3 3 in Fig. 2; Fig. 4, a detail perspective view, on an enlarged scale, with some of the parts broken away to show others more clearly, the disintegrating device being shown in contact with the cylinder instead of away from it, as in the other figures; and Fig. 5, an end elevation of the machine, also on an enlarged scale, with the top part of the casing removed.

In said drawings, the portions marked A represent the outer casing or frame-work of the machine; B, the spout or funnel through which the liquid to be frozen is introduced; C, the revolving cylinder; D, the scraper for removing the ice from the cylinder, and E a disintegrating device by which the film of ice may be broken up when desired.

The casing or frame-work A is of any suitable construction for the purpose. It embodies or carries bearings for the revolving cylinder and supports for the scraper and disintegrating device, and also supports the spout and receptacle for the liquid to be frozen. Said spout B is shown as mounted upon the casing A and as discharging inside said casing below the center of the revolving cylinder. A pan is shown as sitting in the bottom of said casing, which may catch the liquid when it is not discharged directly upon the surface of the cylinder. Said spout and said receptacle may be of any desired construction, so far as my present invention is concerned, and are suitably arranged to direct said liquid upon the cylinder, or to permit said cylinder to take up the liquid therefrom as it revolves.

The cylinder C is a plain hollow cylinder having a smooth periphery upon which the liquid is to be frozen. It contains in operation any desired refrigerant, commonly pounded ice and salt. Its ends, however, are preferably constructed double or of two thicknesses, and between said double ends is located either some suitable non-conducting substance—such as disks of paper or pasteboard—or a dead-air space, which prevents the cold from operating through the ends, as has been the case in machines where the cylinders were constructed in the ordinary manner and which has been a very great detriment to the operation of such machines, for the reason that the ice would form on said ends to a considerable thickness, and when broken off would be in pieces of considerable size, instead of in the fine pulverized condition that is most desirable. This has not only been disadvantageous in this respect, but the power of the refrigerant has been largely wasted in this not only unnecessary but objectionable freezing of the material. By this construction these objections are entirely overcome and the entire power of the refrigerant is directed to the periphery of the cylinder, where its operation is that desired.

Inside the cylinder C are curved partitions C', extending from the opening through which the refrigerant is introduced to near the periphery, and at their ends these wings are so formed as to be nearly parallel with the peripheral casing of the cylinder. The convex surfaces of these partitions are toward the advancing side of the cylinder when in operation, and thus the refrigerant is forced out by said wings to the outside of said cylinder, and thus kept in contact therewith, which adds much to the efficiency of the device. The refrigerant falls through the space between the ends of these wings and the interior surface of the peripheral casing of the cylinder as said cylinder revolves, but is, nevertheless, kept in contact with said surface by said wings, as will be readily understood.

The scraper D is in the form of a chute and is mounted on the inwardly-turned ends of the spring-arms $d$, which thus form pivots for said scraper. Said spring-arms are secured to the casing or frame-work A preferably in an upright position, as shown, and are so adjusted as to hold the upper edge of this scraper in contact with the periphery of the cylinder with the required force to enable it to scrape the ice or ice-cream from said cylinder effectually.

The disintegrating device E may be a revolving corrugated breaker or a knife having fine teeth or serrations on its edge. As shown, this device is mounted on spring-arms $e$, secured to the casing or frame-work A, and by which said disintegrating device may be held in contact with the periphery of the cylinder. The device, as shown, consists of a bar or knife with teeth or serrations on its edge, and its ends rest in recesses in the upper edge of the lower half of the casing or frame-work A, while the arms which carry it are simply spring-wires secured to the inside of said frame-work or casing and passing up through holes in said device. When it is desired to hold this device away from the cylinder, it is pulled back and small pins $a$ are inserted in front of it in holes in the bottom of the recesses in which its ends rest. The springs $e$ may be adjusted by properly bending them to give this device just that force against the periphery of the cylinder which may be desired.

It is a peculiarity of liquid prepared to make ice-cream or any of the sweetened ices that it freezes in a flaky condition, because of the saccharine matter therein, and may usually be scraped off from the periphery of the cylinder without any necessity for the use of a disintegrating device, while the liquids from which plain ices are frozen will freeze fast to the periphery of the cylinder and cannot be removed by the scraper without the use of such a disintegrating device as I have shown. In use, therefore, in making ice-cream and such like products the disintegrating device is held back away from the cylinder, while in making plain ices it is allowed to rest against the cylinder. My machine is thus adapted for all these uses by simply manipulating the disintegrating device, as will be readily understood.

Having thus fully described my said invention, what I claim as new, and desire to secure by Letters Patent, is—

1. The combination, in a machine for making ice, ice-cream, &c., of the cylinder containing the refrigerant, a receptacle for the liquid to be frozen, and a scraper or chute for removing the product, said cylinder having internal partitions, which partitions extend in curved lines from near the center to near the periphery, the convex sides being toward the advancing side of the cylinder in operation, whereby the refrigerant is forced toward the outside of the cylinder and held against its peripheral casing, while at the same time it is permitted to drop or slide through from one division to another, substantially as shown and described.

2. The combination, in a machine for making ice, ice-cream, &c., with the cylinder thereof, of an adjustable spring-mounted disintegrating device, substantially as set forth.

3. The combination of the frame, the revolving cylinder containing a refrigerant, a receptacle for the liquid to be frozen, a scraper for removing it therefrom, and an adjustably-mounted spring-operated disintegrating device, substantially as set forth.

4. In a machine for making ice, ice-cream, &c., the combination of a revolving cylinder containing a refrigerant, a receptacle for the liquid to be frozen, a scraper for removing the ice from said cylinder when frozen, and spring-arms having inwardly-turned ends forming pivots upon which said scraper is mounted, substantially as shown and described.

5. The combination, in a machine for making ice, ice-cream, &c., of the cylinder, a receptacle for the liquid to be frozen, a spring-mounted scraper for removing it therefrom, and a spring-mounted disintegrating device, substantially as set forth.

6. The combination, in a machine for making ice, ice-cream, &c., of the cylinder, a receptacle for the liquid to be frozen, a scraper for removing it therefrom, and a disintegrating device resting in slides in the frame-work arranged directly above the scraper and mounted on spring-arms, substantially as shown and described.

7. The combination, in a machine for making ice, ice-cream, &c., of a revolving cylinder, a receptacle for the liquid to be frozen, a scraper for removing the ice therefrom when frozen, and a disintegrating device arranged in advance of the scraper and mounted on spring-arms, and small pins $a$, whereby when desired said scraper can be held out of contact with said cylinder, substantially as shown and described.

In witness whereof I have hereunto set my hand and seal, at Indianapolis, Indiana, this 27th day of December, A. D. 1889.

LAFAYETTE D. RAILSBACK. [L. S.]

Witnesses:
C. BRADFORD,
JAMES WALSH.